US012682924B2

(12) United States Patent
Wu et al.

(10) Patent No.: US 12,682,924 B2
(45) Date of Patent: Jul. 14, 2026

(54) DIFFERENTIAL VOLTAGE-MODE DRIVER FOR MICROWAVE-ASSISTED MAGNETIC RECORDING

(71) Applicant: Marvell Asia Pte, Ltd., Singapore (SG)

(72) Inventors: Kai Wu, Singapore (SG); Ved Prakash Vats, Singapore (SG); Simon Sheung Yan Ng, Singapore (SG); Hendika Fatkhi Nurhuda, Singapore (SG)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 19/241,637

(22) Filed: Jun. 18, 2025

(65) Prior Publication Data

US 2025/0391434 A1 Dec. 25, 2025

Related U.S. Application Data

(60) Provisional application No. 63/662,967, filed on Jun. 21, 2024.

(51) Int. Cl.
| | |
|---|---|
| *G11B 5/00* | (2006.01) |
| *G11B 5/02* | (2006.01) |
| *G11B 5/465* | (2006.01) |
| *G11B 20/10* | (2006.01) |

(52) U.S. Cl.
CPC ...... *G11B 5/465* (2013.01); *G11B 2005/0024* (2013.01)

(58) Field of Classification Search
CPC . G11B 19/041; G11B 5/02; G11B 2005/0008; G11B 2005/0024; G11B 5/00; G11B 5/035; G11B 2005/0018; G11B 2020/1085; G11B 20/10027
See application file for complete search history.

(56) References Cited

U.S. PATENT DOCUMENTS 7,522,368 B2 *   4/2009  Xia ........................ H02P 25/034
                                          318/568.22

* cited by examiner

*Primary Examiner* — Nabil Z Hindi
(74) *Attorney, Agent, or Firm* — Colby Nipper PLLC

(57) ABSTRACT

This disclosure describes an apparatus that enables rapid transitions during microwave-assisted magnetic recording (MAMR) of storage media. In various aspects, the apparatus incorporates a driver circuit configured to provide a controlled bias current through separate source and sink output terminals, which respond to feedback signals. An MAMR sensor connects between the source and sink output terminals and generates microwave fields when receiving the controlled bias current from the driver circuit. A common-mode feedback (CMFB) loop connects to the source and sink output terminals, detects common-mode voltage (CMV), and delivers feedback signals to the driver circuit to maintain CMV regulation of the MAMR sensor. A differential voltage regulation loop connects to the source and sink output terminals, providing feedback signals that maintain the MAMR sensor voltage differential at a reference value. The apparatus controls the magnetic recording process of the MAMR sensor with rapid transition times.

20 Claims, 6 Drawing Sheets

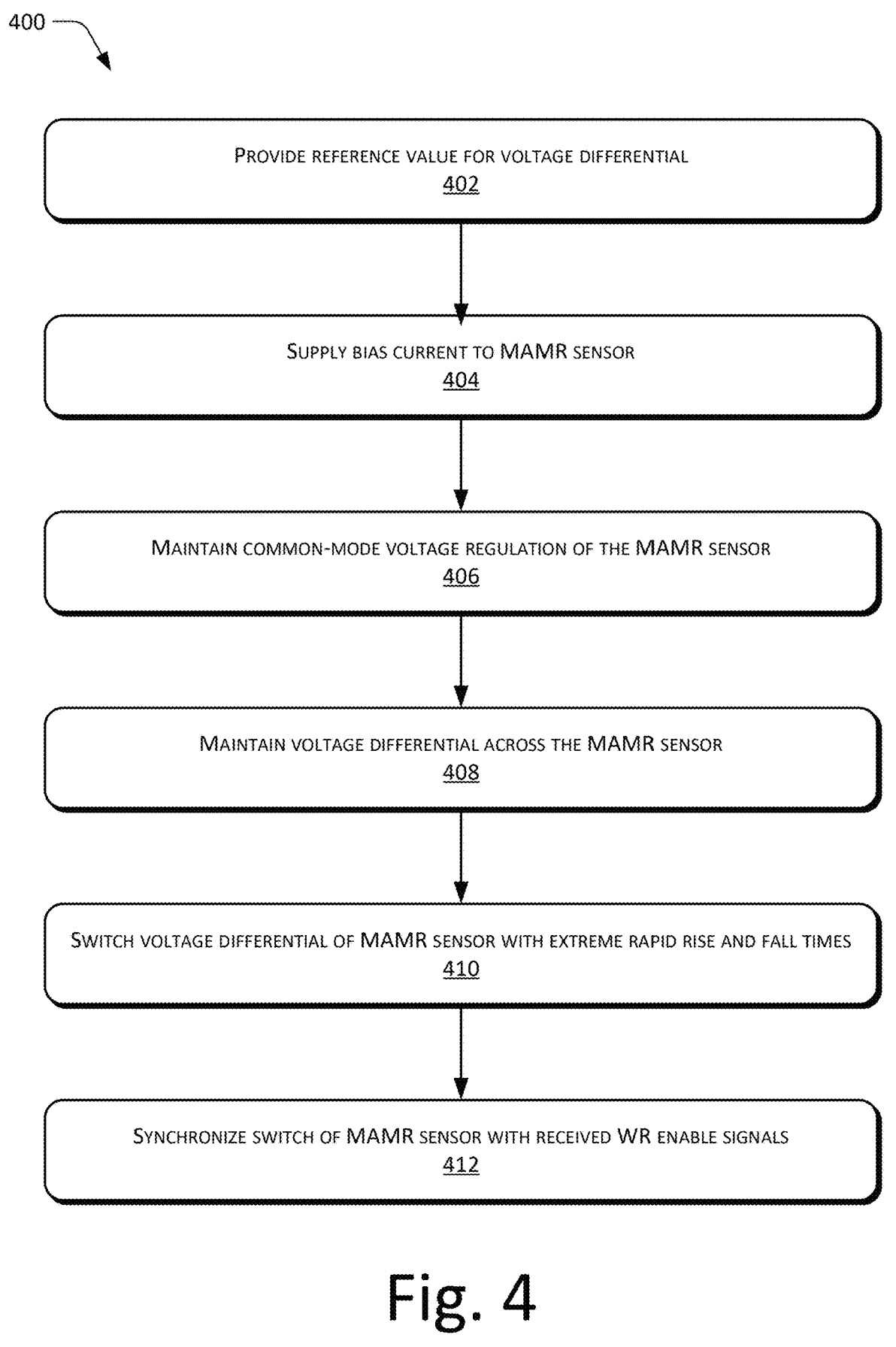

400

PROVIDE REFERENCE VALUE FOR VOLTAGE DIFFERENTIAL
402

SUPPLY BIAS CURRENT TO MAMR SENSOR
404

MAINTAIN COMMON-MODE VOLTAGE REGULATION OF THE MAMR SENSOR
406

MAINTAIN VOLTAGE DIFFERENTIAL ACROSS THE MAMR SENSOR
408

SWITCH VOLTAGE DIFFERENTIAL OF MAMR SENSOR WITH EXTREME RAPID RISE AND FALL TIMES
410

SYNCHRONIZE SWITCH OF MAMR SENSOR WITH RECEIVED WR ENABLE SIGNALS
412

Fig. 4

DIFFERENTIAL VOLTAGE-MODE DRIVER FOR MICROWAVE-ASSISTED MAGNETIC RECORDING

CROSS-REFERENCE TO RELATED APPLICATION

This present disclosure claims priority to U.S. Provisional Patent Application Ser. No. 63/662,967 filed Jun. 21, 2024, the disclosure of which is incorporated by reference herein in its entirety.

BACKGROUND

In the realm of data storage technology, some hard-disk drives (HDDs) utilize microwave-assisted magnetic recording (MAMR) with an MAMR sensor (e.g., spin torque oscillator) to generate microwave fields when writing or erasing data. These microwave fields provide auxiliary energy during the writing/erasing process, temporarily reducing the energy barrier for magnetic switching. As a result, MAMR-enabled HDDs can use smaller write heads while magnetizing increasingly more dense storage media that would otherwise be too difficult to modify with conventional recording methods. Furthermore, MAMR technology allows HDDs to continue increasing area density while maintaining data integrity and readability.

An HDD with MAMR technology writes data throughout the operation by positioning the head over specified tracks on spinning disk platters. Initially, the write head generates a magnetic field-assisted by the microwave field from the MAMR sensor-to align magnetic domains on the disk surface in patterns representing binary data. Meanwhile, as the disk rotates at high speeds, the head alternates between data and servo sectors containing positioning information. Additionally, each revolution requires the read/write head to transition between writing data and reading servo sectors multiple times, occurring frequently (e.g., approximately every fifty to a hundred microseconds). MAMR circuitry controls magnetic field generation with timing during these transitions, with only a few microseconds to finish the transition from write mode to servo read mode for the next sector. With a degauss period of the MAMR sensor taking up to twenty nanoseconds, the MAMR circuitry often fails to complete degaussing before a next transition to servo mode, resulting in additional read attempts and associated latency.

SUMMARY

This summary is provided to introduce subject matter that is further described in the Detailed Description and Drawings. Accordingly, this Summary should not be considered to describe essential features nor used to limit the scope of the claimed subject matter.

In various aspects, an apparatus that facilitates a fast transition during microwave-assisted magnetic recording (MAMR) includes a driver circuit that is configured to provide a controlled bias current, where the driver circuit has separate source and sink output terminals and responds to feedback signals. A MAMR sensor couples between the source and sink output terminals, through which the MAMR sensor receives the controlled bias current that the driver circuit provides, where the MAMR sensor is configured to generate microwave fields. The apparatus includes a common-mode feedback (CMFB) loop that couples to the source and sink output terminals of the driver circuit, where the CMFB loop configures to detect common-mode voltage (CMV) and provide feedback signals to the driver circuit, thereby maintaining CMV regulation of the MAMR sensor. Additionally, a differential voltage regulation loop couples to the source and sink output terminals of the driver circuit, where the differential voltage regulation loop configures to provide feedback signals and maintain a voltage differential of the MAMR sensor at a reference value.

In some aspects, a hard-disk drive system that facilitates a fast transition during MAMR includes a write head that includes an MAMR sensor. The hard-disk drive system also includes voltage-mode (vMode) driver circuitry, which is configured to drive a differential voltage of the MAMR sensor. The voltage-mode (vMode) driver circuitry includes a driver circuit, where the driver circuit responds to feedback signals and has separate source and sink output terminals between which the MAMR sensor couples. A common-mode feedback (CMFB) loop couples to the source and sink output terminals of the driver circuit, where the CMFB loop configures to detect common-mode voltage (CMV) and provide feedback signals to the driver circuit to maintain CMV regulation of the MAMR sensor. A differential voltage regulation loop couples to the source and sink output terminals of the driver circuit, where the differential voltage regulation loop configures to provide feedback signals to maintain a voltage differential of the MAMR sensor at a reference value.

In other aspects, a method that facilitates a fast transition during MAMR includes operations that control a MAMR sensor. The method includes providing a reference value for a voltage differential that establishes target operational parameters. The method provides, through a driver circuit, a bias current to the MAMR sensor of a magnetic media read/write channel, enabling the generation of a microwave field within specified operational ranges. A common-mode feedback (CMFB) loop that couples to drive the circuit to maintain a common-mode voltage (CMV) regulation of the MAMR sensor at approximately zero volts. The method maintains the voltage differential across the MAMR sensor at the reference value through monitoring and adjustment processes, ensuring operational stability. The method switches the voltage differential across the MAMR sensor with rise and fall times of twenty nanoseconds or less, enabling rapid deactivation sequences that prevent residual magnetic field interference.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of a differential voltage-mode (vMode) driver for microwave-assisted magnetic recording (MAMR) of storage media are outlined in the accompanying figures and the detailed description below. In the figures, the left-most digit of a reference number identifies the figure in which the reference number first appears. The use of the same reference numbers in different instances in the description and the figures indicates like elements:

FIG. 4 depicts an example method for differential vMode of driving a MAMR sensor in accordance with one or more aspects;

DETAILED DESCRIPTION

Figure 1:
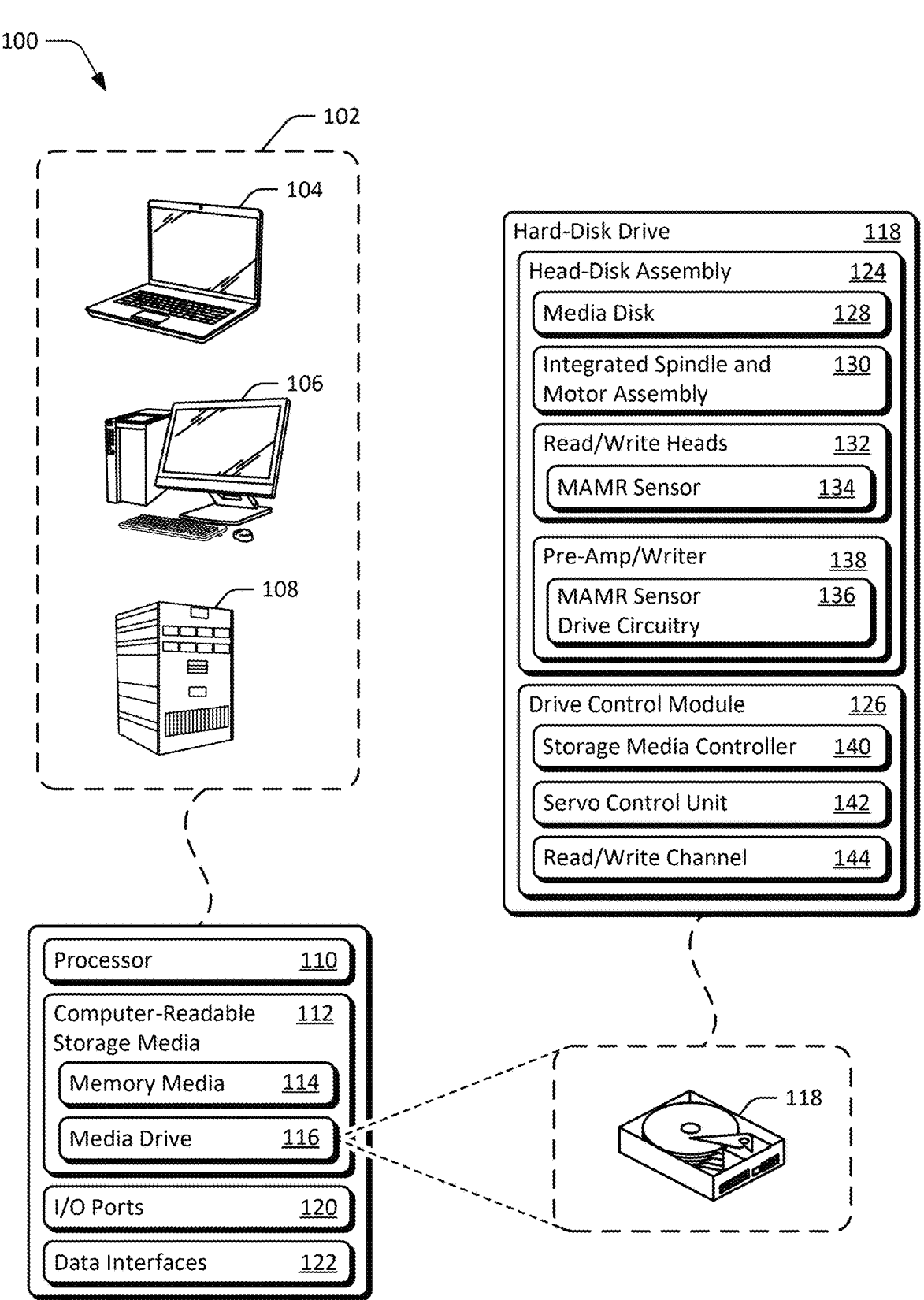
FIG. 1 illustrates an example operating environment having devices in which a differential vMode driver may be implemented.

Hard-disk drive (HDD) systems employing Microwave Assisted Magnetic Recording (MAMR) technology typically exhibit operational issues related to MAMR sensor deactivation or transition timing. Generally, an HDD with MAMR technology writes data throughout the operation by positioning the head over specified tracks on spinning disk platters. Initially, the write head generates a magnetic field—assisted by the microwave field from the MAMR sensor—to align magnetic domains on the disk surface in patterns representing binary data. Meanwhile, as the disk rotates at high speeds, the head alternates between data and servo sectors containing positioning information. Additionally, each revolution requires the read/write head to transition between writing data and reading servo sectors multiple times, occurring frequently (e.g., approximately every fifty to a hundred microseconds). MAMR circuitry controls magnetic field generation with timing during these transitions, with only a few microseconds to finish the transition from write mode to servo read mode for the next sector.

In some cases, the MAMR sensor of a write head of a hard-disk drive may fail to fully deactivate before the write head moves to a new location. This failure can create residual magnetic fields that persist during head movement, which can alter data stored on disk surfaces as the head travels. Further, servo pattern corruption degrades track location precision in drive system addressing capabilities, such as in high-density storage configurations with minimal track spacing that are vulnerable to positioning errors. These positioning inaccuracies initially cause isolated data corruption and can eventually lead to drive failure as systems cannot accurately locate tracks.

These deactivation timing issues manifest prominently during write-to-servo transitions during which, after completing a write operation, a write head must deactivate to read servo positioning information from dedicated disk areas. Typically, this servo reading processes may take approximately twenty nanoseconds (ns) to complete, with each revolution requiring the read/write head to transition between writing data and reading servo sectors multiple times, occurring frequently (e.g., approximately every fifty to a hundred microseconds). With a degauss period of the MAMR sensor taking up to twenty nanoseconds, the MAMR circuitry often fails to complete degaussing before a next transition to servo mode, resulting in the servo pattern corruption and positioning errors.

By way of example, in hard-disk drives that utilize preceding versions of MAMR technology, an operational issue can occur at a write-head transitional period when the write head moves from one location to another on the media disk. Prior to this transitional period, the write head should fully deactivate to eliminate any residual magnetic field. Without full deactivation, the write head retains lingering unwanted residual magnetism that inadvertently alters data of the media disk. Consequently, this alteration potentially corrupts data not intended for modification.

This unwanted residual magnetism leads to a phenomenon known as pole erasure, where magnetic fields exist even without an active write signal and gradually corrupt data on the media disk. Additionally, pole erasure creates problems when affecting servo areas, as servo patterns provide positioning information for the entire hard-disk drive system. With repeated exposure to these residual fields, servo positioning data deteriorates as the magnetic patterns become altered. Since the positioning system relies on accurate servo patterns to locate tracks, errors accumulate over time. Eventually, the hard-disk drive system cannot reliably locate specific data tracks, thereby leading to complete drive function failure rather than isolated data corruption.

The preceding versions of MAMR technology sensor write heads typically use closed-loop voltage systems that employ voltage feedback circuits that maintain voltage levels. These preceding versions of write heads take longer to deactivate (e.g., hundreds of ns) than the time needed to read/write servo position information (e.g., approximately twenty ns). As a result, this timing discrepancy means the preceding versions of MAMR write heads continued to generate residual magnetic fields long after being triggered to stop. The timing discrepancy problem undermines the addressing mechanism of the drive system that allows the hard disk drive system to find and access specific data locations, which makes it an issue about reliability and data integrity. The effects appear particularly severe in high-density recording scenarios where track spacing is minimal and positioning accuracy specifications are extremely stringent.

In contrast with preceding techniques, this disclosure describes aspects of a differential voltage-mode (vMode) driver to enable control of the magnetic recording process of a MAMR sensor with extremely fast transition times. In various aspects, MAMR control circuitry may include a vMode driver with a driver circuit, a common-mode feedback (CMFB) loop, and a differential voltage regulation loop. The CMFB loop is configured to detect common-mode voltage (CMV) and provide feedback signals to the driver circuit, thereby maintaining CMV regulation of the MAMR sensor. The differential voltage regulation loop is configured to provide feedback signals and maintain a voltage differential of the MAMR sensor at a reference value. As described herein, the vMode driver and associated circuitry enable rapid MAMR sensor deactivation and/or transitions with shorter degauss periods (e.g., less than 20 ns), which reduce residual magnetic fields that persist during head movement and prevent servo pattern corruption.

The following discussion describes an operating environment, techniques that may be employed in the operating environment, and a hard-disk drive system in which components of the operating environment can be embodied. In the context of the present disclosure, reference is made to the operating environment by way of example only.

Operating Environment

FIG. 1 illustrates an example operating environment 100 having a computing device 102 (e.g., host device), capable of storing data or accessing data from various storage devices, such as a magnetic media-based drive. Examples of a computing device 102 may include a laptop computer 104, a desktop computer 106, and a server 108, any of which may be configured as part of a storage network or cloud storage. Further examples of a computing device 102 (not shown)

may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on.

Generally, the computing device 102 may provide, communicate, or store data for any suitable purpose, such as to contribute to functionalities of a particular type of device, provide a user interface, enable network access, implement gaming applications, playback media, provide navigation, edit content, provide data storage, or the like. Alternatively or additionally, the computing device 102 is capable of storing various data, such as databases, user data, multimedia, applications, operating systems, and the like. One or more computing devices 102 may be configured to provide remote data storage or services, such as cloud storage, archiving, backup, client services, records retention, and so on.

The computing device 102 includes a processor 110 and computer-readable storage media 112, in an implementation. The processor 110 may be implemented as any suitable type or number of processors, either single-core or multi-core (e.g., ARM or x86 processor cores), for executing instructions or commands of an operating system or other programs of the computing device 102. The computer-readable storage media 112 (CRM 112) includes memory media 114 and a media drive 116. The memory media or system memory of the computing device 102 may include any suitable type or combination of volatile memory or nonvolatile memory. For example, volatile memory of the computing device 102 may include various types of random-access memory (RAM), dynamic RAM (DRAM), static RAM (SRAM) or the like. The non-volatile memory may include read-only memory (ROM), electronically erasable programmable ROM (EE-PROM) or Flash memory (e.g., NOR Flash or NAND Flash). These memories, individually or in combination, may store data associated with applications and/or an operating system of computing device 102.

The media drive 116 of the computing device 102 may include one or more media drives or be implemented as part of a data storage system with which the computing device 102 is associated. In this example, the media drive 116 includes a hard-disk drive system 118 (HDD system 118), which is capable of storing data and is described with reference to various aspects of the differential vMode driver. Alternatively or additionally, the media drive 116 may be configured as any suitable type of data storage drive or system, such as a storage device, storage drive, storage array, storage volume, or the like. Although described with reference to the computing device 102, the media drive 116 may also be implemented separately as a standalone device or as part of a larger storage collective, such as a data center, server farm, or virtualized storage system (e.g., for cloud-based storage or services) in which aspects of the differential vMode driver are implemented.

The computing device 102 may also include I/O ports 120, a graphics processing unit (GPU, not shown), and data interfaces 122. Generally, the I/O ports 120 allow a computing device 102 to interact with other devices, peripherals, or users. For example, the I/O ports 120 may include or be coupled with a universal serial bus, human interface devices, audio inputs, audio outputs, or the like. The GPU processes and renders graphics-related data for computing device 102, such as user interface elements of an operating system, applications, or the like. In some cases, the GPU accesses a portion of local memory to render graphics or includes dedicated memory for rendering graphics (e.g., video RAM) of the computing device 102.

The data interfaces 122 of the computing device 102 provide connectivity to one or more networks and other devices connected to those networks. The data interfaces 122 may include wired interfaces, such as Ethernet or fiber optic interfaces for data communicated over a local network, intranet, or the Internet. Alternatively or additionally, the data interfaces 122 may include wireless interfaces that facilitate communication over wireless networks, such as wireless LANs, wide-area wireless networks (e.g., cellular networks), and/or wireless personal-area-networks (WPANs). Any of the data communicated through the I/O ports 120 or the data interfaces 122 may be written to or read from the storage system of the computing device 102 in accordance with one or more aspects of the differential vMode driver for MAMR of storage media.

Returning to the media drive 116, the computing device 102 may include the HDD system 118 as shown and/or other types of storage media devices in which the differential vMode driver may be implemented. Although not shown, other configurations of the media drive 116 are also contemplated, such as a solid-state drive (SSD), a magnetic tape drive, optical media drives, HDD/SSD hybrid drives, and other storage systems that write data to storage media (e.g., magnetic or optical storage media). Alternatively or additionally, the computing device 102 may include an array of media drives or serve as a media drive aggregation device or host for multiple media drives in which aspects of the differential vMode driver may be implemented.

In this example, the HDD system 118 includes a head-disk assembly 124 (HDA 124) and drive control module 126 to implement or enable functionalities of the HDD system 118. In some cases, the drive control module 126 is implemented as a printed circuit board assembly (PCBA) with semiconductor devices, logic, or other circuitry. The HDA 124 includes one or more media disks 128 mounted on an integrated spindle and motor assembly 130. The spindle and motor assembly 130 may rotate the media disk 128 under (or over) read/write heads 132 coupled with a head assembly (not shown) of the HDA 124. The media disks 128 may be coated with a magnetically hard material (e.g., a particulate surface or a thin-film surface) and may be written to, or read from, a single side or both sides.

The read/write heads 132 of the HDD system 118 function as magnetic transducers that write data to and read data from magnetic storage media. These heads operate with associated amplification and control circuitry to perform data transfer operations across the disk surface. The read/write heads 132 integrate with other system components to enable advanced recording technologies, including microwave-assisted magnetic recording capabilities that enhance storage density and performance. The read/write heads 132 may include a MAMR sensor 134.

The pre-amp/writer 138 may receive or store head selection, amplification, and sense current values useful for writing data to or reading data from magnetic media. The read/write heads 132 and/or pre-amp/writer 138 may be configured to function in concert or coordination with other components of the hard-disk drive system 118 to implement aspects of the differential vMode driver for MAMR of storage media.

In aspects, the pre-amp/writer 138 may include MAMR sensor drive circuitry 136 for implementing MAMR to generate microwave fields when writing or erasing data. The MAMR sensor drive circuitry 136 can be configured to drive a differential bias current through terminals of the MAMR sensor 134 of a write head. In some aspects, the MAMR sensor drive circuitry 136 includes a driver circuit (e.g., fast-switching driver circuit) coupled to power supply connections. Depending upon the implementations, the power supply connections may include a power supply and ground pair or a positive power supply and negative power supply pair.

This driver circuit includes separate source and sink output terminals through which the driver circuit provides the MAMR sensor 134 with a controlled differential bias current. The MAMR sensor drive circuitry 136 also includes a common-mode feedback (CMFB) loop independently coupled to the terminals of the MAMR sensor, with the CMFB loop configured to maintain common-mode voltage (CMV) regulation of the MAMR sensor.

The read/write heads 132 may be operably coupled with a pre-amplifier/writer module 138 (pre-amp/writer 138) of the HDA 124 that includes pre-amplifier circuitry for amplifying write signals or read signals of the read/write heads 132. As shown in FIG. 1, the example drive control module 126 of the HDD system 118 includes a storage media controller 140, a servo control unit 142, and a read/write channel 144 (R/W channel 144). Generally, the storage media controller 140 enables the computing device 102 to access the contents of magnetic storage media of the media drive 116, such as an operating system, applications, or data for applications or other services. The storage media controller 140 may also write and read data of the computing device 102 to and from the magnetic storage media of the media drive 116. In some cases, the drive control module 126 directs or uses the servo control unit 142 to control mechanical operations, such as read/write head 132 positioning through the HDA 124 and rotational speed control through the spindle and motor assembly 130.

The servo control unit 142 directs mechanical positioning of read/write heads 132 over specific tracks on media disks 128. The servo control unit 142 moves the read/write heads 132 to locations across a magnetic media within the HDA 124. Additionally, the servo control unit 142 regulates rotational velocity of media disks 128 through the spindle and motor assembly 130. The read/write channel 144 may include digital-to-analog and analog-to-digital paths for converting write data to write signals or converting read signals to read data, respectively. For example, the read/write channel 144 may process and encode signals when data, such as sectors of user data, are written to the media disk 128 as codewords or patterns of bits. Alternatively or additionally, the read/write channel 144 may process and decode signals when encoded data, such as codewords or bits, are read from multiple sectors of the media disk 128.

This signal processing, encoding, and/or decoding of the write signals or read signals may include signal conditioning, sampling, equalization, phase adjustment, detection, error-correction, or the like. The drive control module 126 or components thereof may be implemented as one or more IC chips, a System-on-Chip, a System-in-Package, or a microprocessor provided with or implementing a hard-disk-drive controller. The drive control module 126 may also include drive electronics (not shown) and/or include various interfaces, such as a host-bus interface, storage media interface, spindle interface, or a pre-amp/writer interface.

The read/write channel 144 converts digital computer data to analog magnetic patterns and back again. While writing, read/write channel 144 transforms digital data into codewords with error correction capabilities. The read/write channel 144 converts these digital codewords to analog electrical signals that create magnetic patterns across magnetic media of multiple disk sectors. Each sector of disk media may include partitions holding specific codewords or data blocks according to patterns of bits written to the magnetic media. The digital-to-analog conversion involves timing to create accurate magnetic patterns. While reading, magnetic variations on the disk generate analog electrical signals. These signals undergo amplification before processing. The analog signals go through detection processes that convert them to digital bit streams. Read/write channel 144 identifies codeword or block boundaries using synchronization marks during analog-to-digital conversion. After conversion, the read/write channel 144 then decodes these codewords into original user data.

Figure 2:
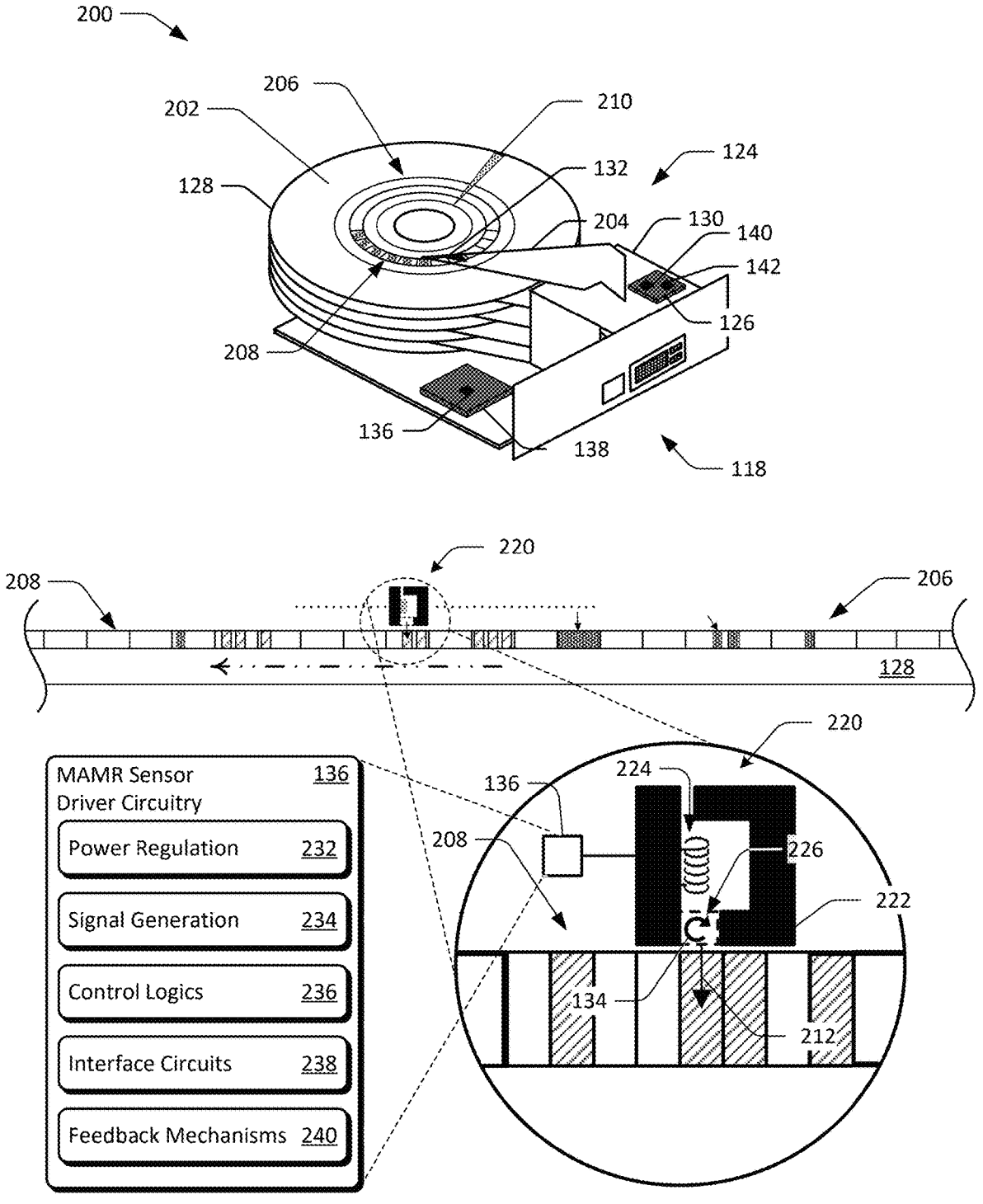
FIG. 2 illustrates an example configuration of the hard-disk drive shown in FIG. 1 with an MAMR-enabled write head.

FIG. 2 illustrates at 200 an example configuration of the HDD system 118 shown in FIG. 1. As shown in FIG. 2, the HDA 124 of the HDD system 118 includes an integrated spindle and motor assembly 130 by which media disks 128 of magnetic media 202 are supported and/or operated, in an implementation. The servo control unit 142 directs the movement of an arm 204 and thus positions a read/write head 132 (or multiple read/write heads 132) over a desired track 206 of the magnetic media 202 on the media disk 128.

The media disks 128 contain dedicated servo areas 210 (such as servo area 210) with positioning information recorded on the magnetic media 202. These servo areas (such as servo area 210) appear at intervals around each track 206, creating reference markers that help read/write heads 132 maintain alignment. The servo areas store patterns that encode track numbers, sector identifiers, and positioning offsets. When read/write heads 132 pass over these servo areas, the resulting signals travel to the pre-amplifier/writer 138 for processing. The servo control unit 142 uses this positional data (e.g., servo information) to calculate corrections and/or to track sector locations across the disk surface. Accurate interpretation of servo positioning information enables the system to access specific sectors 208 where data resides.

Write-to-servo transitions occur regularly when the read/write channel 144 converts data into error-corrected codewords (or bits), which are written to sectors 208 of magnetic media. While writing along a track 206, the servo control unit 142 temporarily halts writing to assess position; consequently, the write current to read/write heads 132 stops as these heads move over servo areas. During this pause, a timing recovery circuit can adjust sampling phases to read servo signals, allowing the servo control unit 142 to reposition the actuator arm 204 before writing continues at the subsequent sector 208.

Generally, the read/write head 132 may include various numbers of head elements with combined or separate functions (e.g., dedicated R/W functions). For example, the read/write head 132 may include one or more readers (read heads/elements) and one writer (write head/element). In other cases, the read/write head 132 may include a dedicated write head (element) and one or more separate, additional dedicated read heads (elements).

Alternatively or additionally, although multiple arms 204 are shown in FIG. 2, the HDA 124 or spindle and motor assembly may be implemented with a single arm 204 or other suitable structures for positing the read/write head 132. The HDA 124 and the drive control module 126 may be implemented separately, on separate substrates, and/or as separate PCBAs of a media drive. Signals or data communicated between the HDA 124 and the drive control module 126 may be carried through a flexible printed cable or other suitable connective structures, such as traces, connectors, bond wires, solder balls, or the like.

When operational, the HDD system 118 alternates between two main functions: track seeking and track following. During track seeking, the read/write head 132 moves from the present track (e.g., of tracks 206) to a destination track. Subsequently, during track following, the read/write head 132 maintains a position as close as possible to the track center while reading or writing information. Furthermore, a Positioning Error Signal (PES) develops by comparing the balance of amplitude between inner and outer bits in the servo patterns, thereby determining how accurately the read/write head 132 centers over a track 206.

The writing of data involves applying a magnetic field through the write head 220 of the read/write head 132 to align magnetic domains on the media disk 128 in patterns representing binary data. In addition, erasing data operates as a specialized form of writing data, where existing data receives new patterns that reset the magnetic domains to a different state. With Perpendicular Magnetic Recording (PMR) technology, magnetic domains are arranged perpendicularly to the disk surface, thus increasing storage density.

FIG. 2 also includes an illustration of example sectors 208 configured to store data that is written to the magnetic media 202 of a media disk 128. One or more of the read/write heads 132 may write data (e.g., user data or codewords) to respective sectors 208 of the tracks 206 of a media disk 128 (e.g., a sector of track 206). For illustrative purposes, a top media disk 128 is shown to include tracks 206, for example, after being written with sectors 208 of data by a read/write head 132.

Generally, during write operations, the read/write head 132 may be driven by a write current provided by the pre-amp/writer 138, whereby an electrical signal is used to generate and/or transfer magnetic fields having associated polarities of encoded bits to the media disk 128. In response to application of the magnetic fields or write fields, the read/write head 132 may form a plurality of magnets in magnetic grains of the sectors 208 of the media disk 128 that correspond to the encoded data (e.g., user data). The HDA 124 of the HDD system 118 may be configured to perform write operations in accordance with any suitable recording technology, such as Perpendicular Magnetic Recording (PMR), Shingled Magnetic Recording (SMR), Heat-Assisted Magnetic Recording (HAMR), MAMR, or the like.

One or more implementations of the technology described herein employ MAMR technology along with a write head 220 of the read/write head 132 and/or the pre-amp/writer 138 to write and erase data on the media disks 128. The MAMR-based write head 220 includes a write-head assembly 222, a write coil 224, a write gap 226 (or aperture), and an MAMR sensor 134. In aspects, the MAMR sensor drive circuitry 136 is connected to the MAMR sensor 134 and is either part of or is connected to the pre-amp/writer 138.

The write-head assembly 222 may provide a structural framework housing all other elements of the write head 220. Further, the write-head assembly 222 can provide mechanical stability while also establishing proper alignment of the magnetic components relative to the surface of the media disks 128. In some cases, the write-head assembly 222 incorporates shielding to prevent electromagnetic interference between adjacent components.

The write coil 224 of the write-head assembly can be configured as a tightly wound conductive structure (e.g., typically copper) that generates the primary magnetic field in response to an application of current. When electrical current flows through the write coil 224, the resulting electromagnetic field extends through the write gap 226. Furthermore, the write coil 224 converts electrical energy into the magnetic energy that alters the magnetic domains on the disk surface during the writing process. The intensity of the magnetic field produced by the write coil 224 varies in proportion to the amount of current applied.

The write gap 226 (or aperture) creates a controlled discontinuity between the magnetic pole structures of the write head 220. This allows magnetic flux to emerge from the internal components. The write gap 226 allows the magnetic field generated by the write coil 224 to extend outward toward the magnetic media 202 below the write head 220. During operation, the magnetic field projects through the write gap 226 with sufficient strength to magnetize domains on the media disks 128 below.

The dimensions of the write gap 226 can directly influence field strength, focus, and recording precision on the magnetic media 202. Thus, the write gap 226 may be configured to balance multiple factors including field projection characteristics and mechanical stability while maintaining consistent distance from the recording surface of the media disks 128. When electrical current flows through the write coil 224, a resulting electromagnetic field 212 extends through the write gap 226 to the sectors 208 of the media disks 128.

The MAMR sensor 134 functions as a microwave-generating element within the MAMR-based write head 220. The MAMR sensor 134 operates as a spin torque oscillator, which utilizes electron spin properties to create high-frequency assistance fields. Additionally, the MAMR sensor 134 may produce oscillations in the range of 20-40 GHz when properly energized by the differential current from implementations of the current-mode (vMode) driver of the MAMR sensor drive circuitry. Furthermore, the MAMR sensor 134 provides supplemental energy to the magnetic field from the write coil 224. This enables recording on higher-density magnetic media 202 that would otherwise resist magnetization. The MAMR sensor 134 includes a resistive element that responds to current flow with microwave field generation.

Within the write gap 226, the MAMR sensor 134 may be positioned to optimize or control field interaction with the disk surface. The write gap 226 positions the MAMR sensor 134, where both the primary magnetic field and microwave field can effectively combine before reaching the magnetic media 202. Thus, during writing operations, the fields from both the write coil 224 and the MAMR sensor 134 project through the write gap 226 simultaneously. As the read/write head 132 transitions between writing data and reading servo areas 210, both the write coil 224 and MAMR sensor 134 need to turn off rapidly to prevent residual fields from affecting the positioning information stored in these servo areas 210. However, in conventional approaches, the transition or degauss time of the MAMR sensor may not be fast enough between writing and reading modes.

In aspects, an MAMR sensor driver circuitry 136 functions as the electronic control system for the MAMR sensor 134. The MAMR sensor driver circuitry 136 can drive the sensor by delivering controlled current or voltage to the MAMR sensor 134. As a result, the MAMR sensor 134 generates microwave oscillations, with the MAMR sensor driver circuitry 136 coordinating activation and deactivation timing with write operations. Various implementations of the MAMR sensor driver circuitry 136 may include power regulation components 232, signal generation circuits 234, control logic sections 236, interface circuits 238, and feedback mechanisms 240. The power regulation components 232 can be configured to provide stable electrical input to the MAMR sensor 134. The signal generation circuits 234 create the specific electrical patterns used for proper operation of the sensor. The control logic sections 236 manage the timing of various operations of the MAMR-based write head 220.

The interface circuits 238 may function as communication pathways that translate control signals (e.g., write enable signal) from the drive control module 126 into specific electrical instructions for the MAMR sensor 134. Additionally, these interface circuits establish connections with multiple systems including the pre-amplifier/writer 138, servo control unit 142, and timing systems to contribute to synchronized operation across the entire HDD system 118. Also, the MAMR sensor driver circuitry 136 may incorporate the feedback mechanisms 240 that continuously monitor performance parameters. These feedback systems facilitate maintain improved operation across varying conditions.

The architecture of the MAMR sensor driver circuitry 136 typically follows either a voltage mode (e.g., vMode) or a current mode (e.g., iMode) approach. In voltage-mode configurations, the circuitry controls specific voltage levels across the MAMR sensor 134. Conversely, current-mode approaches regulate the amount of current flowing through the MAMR sensor 134. Each approach offers different characteristics in terms of response time, stability, and power efficiency. Regardless of the approach, the MAMR sensor driver circuitry 136 enables writing to magnetic materials while deactivating fast enough to prevent residual magnetic fields that might otherwise corrupt data on the magnetic media 202 of the media disks 128.

Figure 3:
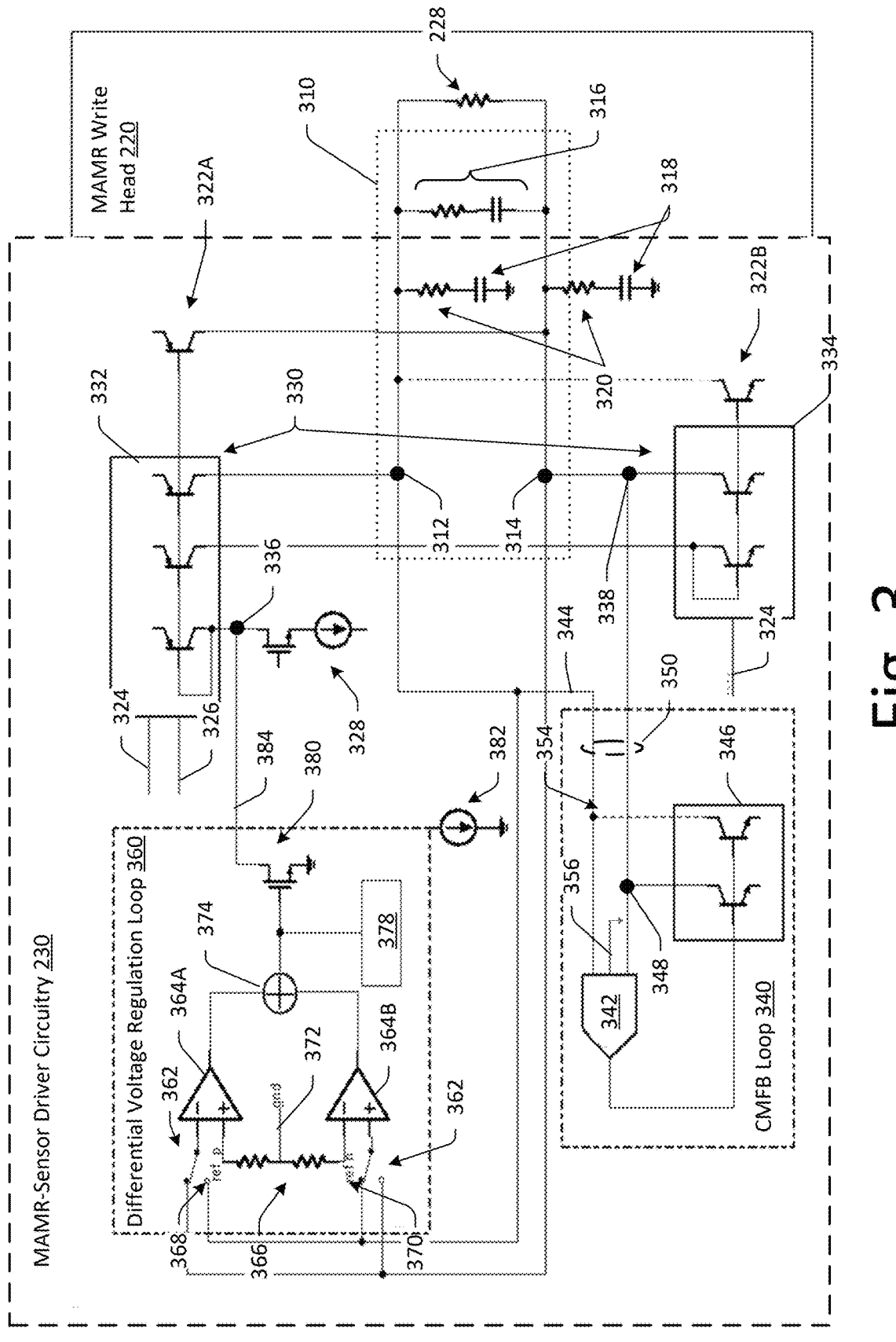
FIG. 3 is an example schematic diagram of circuitry of an example implementation of a differential vMode driver for MAMR.

FIG. 3 is a schematic diagram of example circuitry of a MAMR-based write head 220 and the MAMR sensor driver circuitry 136. As shown, the MAMR sensor 134 is part of the write head 220. The MAMR sensor driver circuitry 136 is part of or is connected to the pre-amp/writer 138. FIG. 3 shows an MAMR sensor-related circuitry 310, which may be, in whole or in part, part of the write head 220, the pre-amp/writer 138, and/or some other component.

The MAMR sensor 134 is represented in the schematic diagram of FIG. 3 as a resistive element coupled between the MAMR_P node 312 and the MAMR_N node 314. This resistive element functions as a spin torque oscillator, generating microwave oscillations when energized by the differential current from the MAMR sensor driver circuitry 136. The physical resistance characteristics of this element determine the voltage-current relationship that develops across the MAMR sensor 134 during operation.

As shown in FIG. 3, the MAMR sensor-related circuitry 310 is electrically coupled to the MAMR sensor 134. The MAMR sensor-related circuitry 310 includes several interconnected components, such as a MAMR_P node 312, a MAMR_N node 314, damping elements 316, capacitive elements 318, and resistive elements 320. The MAMR_P node 312 and MAMR_N node 314 establish the direct connection points between the MAMR sensor driver circuitry 136 and the MAMR sensor 134. The MAMR_P node 312 serves as the field-entry terminal through which current enters the MAMR sensor 134 ultimately from the power source. Conversely, the MAMR_N node 314 functions as the field-exit terminal where current exits the MAMR sensor 134 ultimately towards ground. These nodes experience the controlled differential voltage developed by the MAMR sensor driver circuitry 136, which in turn establishes the current flow for proper MAMR operation.

Adjacent to or proximate the MAMR sensor 134 are damping elements 316, which are resistive elements that suppress high-frequency oscillations or resonances that otherwise occur in the MAMR sensor driver circuitry 136. By placing controlled impedance in the current path, the damping elements 316 suppress ringing effects on fast transitions, thereby preserving signal integrity on fast switching transitions. The damping elements 316 also contribute to overall system stability by suppressing parasitic, unwanted oscillations that would otherwise degrade write performance.

The MAMR sensor-related circuitry 310 may further include single-ended capacitors on capacitive elements 318, which are coupled to the terminals of the MAMR sensor 134. The capacitive elements 318 perform frequency compensation operations by forming predetermined time constants for signal processing. Further, the single-ended capacitors also stabilize feedback signals by removing transient noise and pass intended differential signals with minimal attenuation. Based on coupling location and correct sizing, these capacitive devices can help improve overall system stability under steady-state conditions and during transitional switching events.

The resistive elements 320 are positioned between the damping elements 316 and the terminals 312/314. The resistive elements 320 help establish voltage divider networks that maintain appropriate signal levels throughout the operating range of the sensor. Together, the capacitive elements 318 and resistive elements 320 produce a combined resistive-capacitive effect that creates well-defined frequency response characteristics for the interface of the MAMR sensor 134 with the MAMR sensor driver circuitry 136. This may enable signal integrity throughout the fast-switching events employed for proper MAMR operation while rejecting unwanted interference or noise components.

The MAMR sensor driver circuitry 136 includes a driver circuit 330, e.g., a driver circuit, a common mode feedback (CMFB) loop 340, and a differential voltage regulation loop 360. In aspects, the driver circuit 330 serves as the power management component that delivers controlled current to the MAMR sensor 134. The driver circuit 330 establishes voltage differentials while maintaining rapid switching capabilities necessary to prevent residual magnetic fields during HDD operations. The driver circuit 330 includes polarity control switches 322A and 322B, write/read enable signal (WR enable signal) 324, the MAMR current digital-to-analog converter (MAMR_IDAC) 326, a startup bias integrated digital-to-analog converter (IDAC) 328, a positive-negative-positive driver (PNP driver) 332, a negative-positive-negative driver (NPN driver) 334, a source output terminal 336, and a sink output terminal 338.

The polarity control switches 322A and 322B provide configurable pathways within the driver circuit 330 that connect the source output terminal 336 and the sink output terminal 338 to the MAMR sensor 134. These switches enable the reversal of current direction through the MAMR sensor 134 when operational requirements change. This functionality accommodates alternative bias configurations without physical circuit modifications.

The driver circuit 330 consists of two complementary sections as depicted in the schematic diagram of FIG. 3, the PNP driver 332 and the NPN driver 334, positioned at the upper and lower portions, respectively. These drivers help establish voltage differentials across the MAMR sensor 134 while maintaining the rapid switching speeds necessary for proper operation.

The PNP driver 332 occupies the upper section of the schematic diagram of FIG. 3 and connects to a power supply (not shown). The PNP driver 332 has a source output terminal 336 that delivers current to the MAMR_P node 312. As depicted, the configuration of the PNP driver 332 includes transistor elements arranged in a topology that enables operation at full bias current, which is the maximum specified current magnitude for improved operating conditions for the MAMR sensor 134. The full bias current provides for maximum drive capability of the MAMR sensor 134 with minimal response delay. As shown in FIG. 3, the PNP driver 332 includes current sourcing components that establish the positive voltage reference at the MAMR_P node 312.

The PNP driver 332 also incorporates a startup bias IDAC 328 that is attached to the source output terminal 336. The startup bias IDAC 328 functions as an initialization component that establishes startup conditions for the MAMR sensor 134 during power-on sequences. The startup bias IDAC 328 enables the PNP driver 332 reaches its improved operating point rapidly and reliably before the feedback loops fully engage. The startup bias IDAC 328 delivers precisely calibrated current settings through digital control inputs. It converts digital values into analog current references that establish the initial operating conditions for the full bias current path. By pre-conditioning the source output terminal 336 with appropriate current levels, the startup bias IDAC 328 minimizes settling time during transitions from inactive to active states. This contributes to the capabilities of the overall circuit.

The NPN driver 334 resides in the lower portion of the schematic diagram of FIG. 3 and forms a direct path to the negative power supply. The NPN driver 334 has a sink output terminal 338 that draws current from the MAMR_N node 314. As depicted, the NPN driver 334 has transistor elements configured to provide controlled current sinking capabilities.

In contrast to the PNP driver 332, the NPN driver 334 utilizes only a partial amount (e.g., a portion) of the total bias current through a technique known as fractional biasing. Specifically, the NPN driver 334 operates with a complementary portion represented mathematically as (1−Fraction) of the full bias current, where "fraction" indicates a deliberately selected percentage of the total current diverted away from the main current path. As will be discussed below, this diverted current segment or portion, equivalent to the "fraction" value, flows into the CMFB loop 340 where it helps provide high-bandwidth sensing of the common mode voltage without loading the main signal path.

Through this strategic current division approach, the driver circuit 330 achieves superior performance characteristics compared to conventional architectures that maintain identical current magnitudes in both sourcing and sinking paths. The reduced current load on the NPN driver 334 creates a smaller capacitive load at the nodes. This helps provide faster transition times (of, for example, 20 ns or less) while simultaneously providing sufficient current for common mode regulation at approximately zero volts. Together, the PNP driver 332 and NPN driver 334 create a push-pull configuration that generates a differential voltage across the MAMR sensor 134 while maintaining accurate common mode regulation. The asymmetric biasing approach, where full current flows through the PNP driver 332 and partial current through the NPN driver 334, establishes the electrical conditions that facilitate achieving fast transition times while ensuring stability across various operating conditions.

FIG. 3 depicts two digital control components as inputs to the driver circuit 330. The digital control components include a Write/Read enable signal (WR EN) 324 and a MAMR current Digital-to-Analog Converter (MAMR_I-DAC) 326. The digital control components establish the connection between the drive control module 126 and the analog MAMR sensor driver circuitry 136 that powers the MAMR sensor 134. In aspects, the WR EN signal 324 functions as a primary control input that synchronizes the MAMR sensor 134 with the servo operations. The WR EN signal 324 indicates precisely when the write head should activate or deactivate. Thus, the WR EN signal 324 triggers the driver circuit 330 to rapidly adjust current through the MAMR sensor 134 within the fast transition window. In some implementations, that fast transition window is less than fifty ns. In other implementations, it may be twenty ns or less. In still other implementations, that fast transition window can be ten ns or less.

The MAMR_IDAC 326 provides configurable or programmable current levels for the driver circuit 330. In so doing, digital control over the magnitude of current flowing through the MAMR sensor 134 is enabled. The MAMR_I-DAC 326 facilitates calibration and adjustment of the microwave field strength generated by the MAMR sensor 134. The CMFB loop 340 occupies the bottom-left section of FIG. 3 and establishes voltage regulation across the MAMR sensor 134. The CMFB loop 340 maintains the common-mode voltage (CMV) at nearly zero volts. This creates balanced operating conditions for proper MAMR functionality. With direct connections to both MAMR_P node 312 and MAMR_N node 314, the CMFB loop 340 implements partial current sampling rather than monitoring the entire signal path. Through this approach, it prevents operational drift while enabling rapid transitions between write and servo operations. The CMFB loop 340 includes a voltage common mode (VCM) gain stage 342, a current sampling circuit 344, a fraction bias circuit 346, a dominant frequency pole 348, and feedback pathways 350.

In aspects, the VCM gain stage 342 functions as the primary amplification element within the CMFB loop 340. In addition to ground 356, this gain stage connects to the current sampling circuit 344 at its input and to the dominant frequency pole 348 at its output. The VCM gain stage 342 amplifies the difference between the detected common mode voltage and the target reference level of nearly zero volts. Through application of controlled gain, the VCM gain stage 342 converts small voltage deviations into substantial correction signals that drive feedback. The gain magnitude directly influences loop responsiveness.

The current sampling circuit 344 establishes connectivity between the MAMR sensor nodes, MAMR_P node 312 and MAMR_N node 314, and the VCM gain stage 342. The current sampling circuit 344 extracts a representative portion of the current flowing through the MAMR sensor 134 without significantly loading the main signal path. With the use of current mirrors and scaling techniques, the current sampling circuit 344 provides an accurate representation of the common mode conditions while consuming minimal power. The partial sampling approach minimizes capacitive loading effects on the primary signal path. This maintains signal integrity during high-speed transitions.

The fraction bias circuit 346 integrates with the NPN driver 334 and current sampling circuit 344 to implement calculated current division. The fraction bias circuit 346 diverts a mathematically defined portion of the bias current away from the NPN driver 334 toward the CMFB loop 340, creating reduced capacitive loading at critical nodes. Through reduction of current-dependent time constants, the fraction bias circuit 346 significantly increases available bandwidth compared to conventional approaches. The fraction value results from optimization between competing requirements for stability, power consumption, and transition speed.

The dominant frequency pole 348 resides at the junction connecting the VCM gain stage 342, fraction bias circuit 346, and NPN driver 334. The dominant frequency pole 348 establishes a deliberate low-frequency cutoff point within the feedback path. This forces a controlled frequency response with, for example, approximately 20 dB/decade roll-off characteristics. Based on its location, the dominant frequency pole 348 facilitates secondary poles occur substantially beyond the unity gain bandwidth. This maintains an adequate phase margin across operating conditions. This frequency compensation approach eliminates requirements for complex multi-pole networks while providing robust stability during rapid transitions.

The feedback pathways 350 establish interfaces between the CMFB loop 340 and the remainder of the MAMR sensor driver circuitry 136 (which is the fast-switching driver circuit 330 and differential voltage regulation loop 360). The feedback paths 350 convey correction signals that modulate output voltage levels according to the sensed common-mode conditions. With low-impedance signal routing, which has minimal parasitic effects, the feedback paths 350 maintain signal integrity while providing feedback. The ongoing compensation offered by such relationships enables common-mode voltage to be held at close to zero volts regardless of changes in operating conditions or component properties. This permits the stable reference structure that is needed for accurate differential voltage control.

In one or more implementations, the CMFB loop 340 also includes a polarity switch 354 interfaces between the VCM gain stage 342 and the feedback pathways 350 within the CMFB loop 340. The polarity switches 354 implements complementary metal-oxide-semiconductor transmission gates connecting to both positive and negative signal paths. Through activation control signals, the polarity switches 354 to reverse the correction signal direction when required. This can accommodate alternative bias configurations or compensate for manufacturing variations in the MAMR sensor 134. During standard operation, the switch maintains default signal routing while providing configuration flexibility without necessitating physical circuit modifications.

The differential voltage regulation loop 360 appears in the upper left-hand section of FIG. 3 and regulates the voltage across the MAMR sensor 134 by maintaining the voltage difference between MAMR_P node 312 and MAMR_N node 314 at a set reference value. This loop includes input switches 362, operational amplifier (op-amp) A 364A, op-amp B 364B, reference network resistors 366, reference voltage ref_p 368, reference voltage ref_n 370, ground connection 372, summing junction 374, control block 378, output driver 380, current source 382, and output node 384. These components function in concert to maintain differential voltage regulation of the MAMR sensor 134.

At the front end of the differential voltage regulation loop 360, a differential voltage monitoring circuit incorporates input switches 362 and signal conditioning components (not shown). The input switches 362 function as polarity control elements that connect to both a MAMR_P node 312 and a MAMR_N node 314, which creates initial sampling points for voltage acquisition. The input switches 362 enable or disable connection of feedback signals to the driver circuit 330. This allows for reversed-bias direction through a mechanism that swaps polarity of control signals. This configuration operates without necessitating physical circuit modifications and serves as an entry point for signals into the differential voltage regulation loop 360. Additionally, these bidirectional switches allow signal flow while providing isolation capabilities when necessary.

Between the input switches 362 and the operational amplifiers 364A and 364B, signal conditioning components prepare captured voltage signals through impedance matching networks and buffer stages. This preparation helps provide minimal loading effect on the MAMR sensor 134 during measurement while preventing signal degradation. Subsequently, conditioned signals travel to non-inverting inputs of op-amp A 364A and op-amp B 364B where comparison with reference values occurs. Through this hierarchical signal path, the differential voltage monitoring circuit establishes a continuous acquisition channel with high fidelity and minimal delay. This helps provide rapid response to deviations from target differential voltages during fast transitions.

As shown in FIG. 3, the op-amp A 364A and op-amp B 364B form a differential gain stage that processes signals passing through the input switches 362. The op-amp A 364A, positioned at the top of the circuit of the differential voltage regulation loop 360, compares voltage at the MAMR_P node 312 with the reference voltage ref_p 368. Concurrently, the op-amp B 364B, located at the bottom of the circuit of the differential voltage regulation loop 360, compares voltage at the MAMR_N node 314 with the reference voltage ref_n 370. These comparisons generate distinct error signals that quantify deviation of each node from desired reference levels. Both error signals proceed to the summing junction 374 for further processing. The reference value is a target voltage differential between the MAMR_P node 312 and MAMR_N node 314 of the MAMR sensor 134. These nodes function as the field-entry terminal and field-exit terminal respectively. The differential voltage regulation loop 360 utilizes this reference value to establish operational conditions for microwave field generation by the MAMR sensor 134. This voltage differential enables the MAMR sensor 134 to activate and deactivate quickly.

Reference voltage generation occurs through components including reference voltage ref_p 368, reference voltage ref_n 370, reference network resistors 366, ground connection 372, and the current source 382. A Voltage Digital-to-Analog Converter (VDAC) of the current source 382 converts digital control signals into analog voltage levels. Thus, the current source 382 serves as the ultimate source of the reference voltages that drive the entire reference generation system. These components of the reference voltage generation establish baseline voltage standards for comparison with monitored voltages of the MAMR sensor 134. The reference network resistors 366 form voltage divider networks within the differential voltage regulation loop 360. These resistive elements connect to the reference voltage ref_p 368, reference voltage ref_n 370, and ground connection 372. This connection creates stable reference points for comparison operations. The resistor network maintains appropriate signal levels throughout the operational range of the MAMR sensor drive circuitry 136.

The reference voltage ref_p 368 serves as an upper threshold for comparison with the MAMR_P node 312 voltage. The reference voltage ref_p 368 defines the target upper bias voltage limit for MAMR sensor 134 operation. It connects to the inverting input of op-amp A 364A. The reference voltage ref_n 370 functions as a lower threshold for comparison with the MAMR_N node 314 voltage. It establishes the target lower bias voltage limit for MAMR sensor 134 functionalities. The reference voltage ref_n 370 connects to the inverting input of op-amp B 364B. The ground connection 372 provides a common reference point for the reference network resistors 366. This may provide consistent voltage measurements across the differential voltage regulation loop 360.

Some implementations incorporate precision bandgap reference circuits that create temperature-stable baseline voltages. Scaling amplifiers adjust these voltages to application-specific levels for biasing the MAMR sensor 134. Digital control lines connect to the current source 382. These control lines allow programmatic adjustment of reference levels based on system requirements. This capability facilitates manufacturing calibration processes. The HDD system 118 undergoes testing to determine improved parameters for each MAMR sensor 134.

The op-amp A 364A and op-amp B 364B within the differential voltage regulation loop 360 continuously compare the voltage across the MAMR sensor 134 with the reference values. The op-amp A 364A compares the MAMR_P node 312 voltage against reference voltage ref_p 368. The op-amp B 364B compares the MAMR_N node 314 voltage against reference voltage ref_n 370. These comparisons generate error signals that drive correction mechanisms. The reference value functions independently from the common-mode voltage regulation performed by the CMFB loop 340. This separation helps provide simultaneous management of differential and common-mode aspects of MAMR sensor 134 operation. Through coordinated operation of precision reference circuits, resistive networks, and ground referencing, the reference voltage generators produce stable comparison thresholds. These thresholds enable the differential gain stage to detect deviations from target differential voltages. This maintains appropriate bias conditions throughout all drive operations.

The summing junction 374 receives and combines error signals generated by the op-amp A 364A and op-amp B 364B. The summing junction 374 creates a single composite error signal that represents total deviation from desired differential voltage across the MAMR sensor 134. This combined error signal then proceeds to the control block 378 for further processing. The control block 378 processes the composite error signal from the summing junction 374. This processing may include gain adjustment, level shifting, and implementation of selected timing logic for pre-charge operations. The control block 378 translates error information into a gate drive signal appropriate for controlling the output driver 380. This helps provide fast voltage transitions. The control block 378 may include timing logic for pre-charge operations that indicate that a pre-charge control circuit exists as a subsystem within this block. The pre-charge functionality may be part of the primary control pathway rather than as a separate circuit block.

The pre-charge control circuit establishes initial conditions during startup or transitions. The pre-charge control circuit responds to delay associated with charging parasitic capacitances from a zero-voltage state, which may extend settling time beyond a desired transition time. To reduce this delay, the pre-charge control circuit applies an initial voltage or current pulse that rapidly charges nodes to near-operational levels before transitioning to regulation mode. This approach reduces settling time by eliminating a portion of charge accumulation period. The implementation may include detection circuitry for transition events, pulse generation logic for pre-charge signals, and switchover mechanisms that transition from pre-charge to normal regulation mode.

At the output stage, the output driver 380 functions as a controlled pull-down element within the differential voltage regulation loop 360. The output driver 380 may be implemented as an NMOS transistor. The gate of this transistor connects to the control block 378, while the source connects to the ground and the drain connects to the output node 384. The output driver 380 adjusts current flow based on the error signal. The adjustment increases the current sink when sensed voltages exceed targets and decreases the current sink when voltages fall below targets.

The current source 382 provides a programmable bias current established through digital-to-analog conversion. This current source works in conjunction with the output driver 380 to establish baseline operating conditions for the MAMR sensor 134 and assists in achieving fast transition times for proper operation. The current source 382 implements voltage digital-to-analog converter (VDAC) functionality. That is, it converts digital control signals into analog current levels.

Digital control lines connect to the current source 382 to contribute to external circuits to adjust bias current magnitude based on operational requirements. This programmable capability serves manufacturing calibration processes when the HDD system 118 undergoes testing to determine improved parameters for each MAMR sensor 134. The digital-to-analog conversion extends to the reference voltage generators through digital interfaces and scaling amplifiers that adjust voltage levels for the reference voltage ref_p 368 and reference voltage ref_n 370. Through this digital-to-analog conversion implementation, the differential voltage regulation loop 360 achieves calibration capability and adaptive operation throughout the operational life of the HDD system 118. The output node 384 serves as a connection point between the differential voltage regulation loop 360 and the driver circuit 330. This node experiences active voltage control through combined actions of the output driver 380 and current source 382. The output node 384 completes the feedback loop by connecting back to the driver circuit 330, which includes a PNP driver 332 and an NPN driver 334.

A frequency-limiting functionality within the differential voltage regulation loop 360 establishes controlled attenuation of high-frequency signals, prevents oscillation through phase margin management, and helps provide stable operation during rapid transitions. This functionality enables the differential voltage regulation loop 360 maintains both stability margins and fast response characteristics necessary for proper operation of the MAMR sensor 134. The frequency-limiting elements perform these functions through creation of dominant poles and selected roll-off characteristics in the frequency response curve of the feedback loop.

These frequency-limiting elements may be implemented within the op-amp A 364A and the op-amp B 364B, or within the control block 378, or in a combination thereof. A dominant pole capacitor, which might exist as part of an op-amp internal architecture and/or as a discrete component within the control block 378, establishes a selected resistance-capacitance time constant. The dominant pole capacitor works in conjunction with resistive network components to produce a defined cutoff frequency, which in turn attenuates high-frequency components of an error signal.

The resistive-capacitive networks establish an elected roll-off slope of roughly-20 decibels per decade. A route via the summing junction 374 to the control block 378 enables a combined error signal to travel via these frequency-shaping elements. Furthermore, an interface between the control block 378 and the output driver 380 provides an alternative potential point for frequency limitation. An output driver gate capacitance 380 and an output resistance from a control block 378 form another resistance-capacitance filtering stage. Through implementation in one or more of these components, the differential voltage regulation loop 360 achieves the balance of response speed to stability for improved performance.

Through coordinated operation of all these components, the differential voltage regulation loop 360 achieves approximately fast transition times of less than fifty ns, twenty ns or less, and/or ten ns or less. The differential voltage regulation loop 360 operates through a continuous sensing-comparison-actuation cycle. That is, the differential voltage regulation loop 36 monitors the voltage across the MAMR sensor 134, compares monitored voltage to the reference value, and then actuates the appropriate corrections to maintain the target differential. This fast response prevents residual magnetic fields during writer degauss transitions. This protects against data corruption in high-density storage applications. The differential voltage regulation loop 360 operates in concert with the CMFB loop 340, with the differential voltage regulation loop controlling differential voltage while the CMFB loop maintains common mode voltage near zero volts.

Referring back to FIG. 2, various components of the MAMR sensor driver circuitry 136 were shown and briefly described. With the context of the MAMR sensor driver circuitry 136 shown in FIG. 3 and described above, components of each description are provided below. Power regulation components 232 supply current to the MAMR sensor 134. Power regulation components 232 include the MAMR_IDAC 326, the startup bias IDAC 328, the PNP driver 332, the NPN driver 334, the source output terminal 336, the sink output terminal 338, and the current source 382.

The power regulation components 232 deliver controlled current to the MAMR sensor 134. The MAMR_IDAC 326 programs current magnitude. The startup bias IDAC 328 pre-conditions the source terminal during initialization. The PNP driver 332 operates at full bias current while the NPN driver 334 operates at a complementary (1–Fraction) bias level. This asymmetric current distribution creates smaller capacitive loads at critical nodes. The current source 382 provides programmable bias through digital-to-analog conversion. These components work together to establish precise voltage differentials with rapid switching capabilities between active and inactive states.

Signal generation circuits 234 produce electrical patterns for sensor operation. Signal generation circuits 234 include the differential voltage regulation loop 360, the reference voltage ref_p 368, the reference voltage ref_n 370, the reference network resistors 366, and the VDAC (within current source 382). The signal generation circuits 234 create electrical patterns for MAMR sensor operation. The differential voltage regulation loop 360 maintains voltage across the MAMR sensor at target values. Reference voltages ref_p 368 and ref_n 370 define the upper and lower bias voltage thresholds. Reference network resistors 366 form voltage dividers that set appropriate signal levels. The VDAC converts digital signals to analog voltages with precision. These components collectively establish baseline voltage standards that define the operating conditions for generating microwave fields by the MAMR sensor.

Control logic sections 236 manage operational timing. Control logic sections 236 include the WR enable signal 324, the control block 378, the pre-charge circuit (within control block), the polarity control switches 322A/B, and the polarity switches 354. The control logic sections 236 coordinate operational timing. The WR enable signal 324 synchronizes the MAMR sensor with servo operations by indicating when the write head should activate or deactivate. The control block 378 processes error signals and converts them to gate drive signals for the output driver. The pre-charge circuit initializes nodes to settled voltage levels during startup and transitions. Polarity switches 322A/B and 354 enable current direction reversal through the MAMR sensor without physical circuit modifications. These control elements work together to achieve fast switching times, aligning the MAMR field with the HDD's servo timing requirements.

Interface circuits 238 form communication pathways. Input switches 362 include input switches 362, the driver circuit 330, the summing junction 374, and the output node 384. The interface circuits 238 establish communication pathways between subsystems. Input switches 362 create sampling points at the MAMR_P and MAMR_N nodes for voltage acquisition. The driver circuit 330 connects the source and sink terminals to the MAMR sensor. The summing junction 374 combines error signals from multiple operational amplifiers. The output node 384 links the voltage regulation loop to the driver circuit. These interface components translate high-level control signals from the drive control module into specific electrical instructions for the MAMR sensor 134. They form the connections between different functional blocks while preserving signal integrity throughout the pathways.

Feedback mechanisms 240 monitor performance parameters. Feedback mechanisms 240 include the CMFB loop 340, the VCM gain stage 342, the current sampling circuit 344, the fraction bias circuit 346, the op-amp A 364A, the op-amp B 364B, the feedback pathways 350, the dominant frequency pole 348, and the frequency-limiting elements. The feedback mechanisms 240 monitor system parameters and make adjustments. The CMFB loop 340 regulates common-mode voltage to approximately zero volts. The VCM gain stage 342 amplifies the difference between detected voltage and the target level. The current sampling circuit 344 extracts a portion of current from the MAMR sensor without loading the main signal path. Op-amps 364A/B compare sensed voltages with reference values. The dominant pole 348 and frequency-limiting elements establish controlled attenuation of high-frequency signals. These feedback components form multiple closed-loop systems that continuously sense conditions, compare against references, and actuate corrections. This continuous adjustment ensures stable voltage regulation during transitions between write operations and servo positioning.

Techniques of the Differential vMode Driver for MAMR

The following discussion describes techniques of the differential vMode driver for MAMR application in HDDs, which may reduce or prevent potential data corruption on the disk because of slow write activation-deactivation transitions for MAMR sensor of the write head. These techniques may be implemented using any of the environments and entities described herein, such as the MAMR-based write head 220, MAMR sensor drive circuitry 136, MAMR sensor related circuitry 310, and the drive control module 126. These techniques include methods illustrated in FIG. 4, which is shown as a set of operations performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, aspects of the methods described may be combined to implement the differential vMode driver for MAMR application in HDDs. In portions of the following discussion, reference will be made to the operating environment 100 of FIG. 1, entities of FIG. 2 and FIG. 3. Such reference is not to be taken as limiting described aspects to the operating environment 100, entities, configurations, or implementations, but rather as illustrative of one of a variety of examples. Alternatively or additionally, operations of the methods may also be implemented by or with entities described with reference to the System-on-Chip of FIG. 5 and/or the storage media controller of FIG. 6.

FIG. 4 depicts an example method 400 for implementing the differential vMode driver for MAMR application in HDDs, including operations performed by or with the MAMR-based write head 220, MAMR sensor drive circuitry 136, MAMR sensor related circuitry 310, and the drive control module 126.

At 402, the differential voltage regulation loop 360 performs reference voltage generation and provides a reference value for the voltage differential that will be applied across the MAMR sensor 134. The differential voltage regulation loop 360 generates reference voltages through reference voltage ref_p 368 and reference voltage ref_n 370. These establish upper and lower bias voltage limits for the MAMR sensor 134. Reference network resistors 366 form voltage divider networks that maintain signal levels. The current source 382 contains a VDAC that converts digital control signals into analog voltage levels. This reference value can operate independently from the CMFB loop 340.

At 404, the driver circuit 330 supplies a bias current to the MAMR sensor 134, contributing to its operation and facilitating fast switching. Typically, the bias current is based upon the specifics of the MAMR sensor 134. The driver circuit 330 delivers current through two sections: the PNP driver 332 and the NPN driver 334. The PNP driver 332 operates at full bias current through the source output terminal 336. The NPN driver 334 operates at a portion (1−Fraction) of full bias current through the sink output terminal 338. This creates a smaller capacitive load at the nodes. The startup bias IDAC 328 pre-conditions the source output terminal 336 with appropriate current levels. The MAMR_IDAC 326 controls the magnitude of current flowing through the MAMR sensor 134.

At 406, the CMFB loop 340 maintains common-mode voltage regulation of the MAMR sensor 134, which helps provide stability around a reference point of nearly zero volts. The CMFB loop 340 regulates the common-mode voltage at nearly zero volts. The VCM gain stage 342 amplifies the difference between detected common mode voltage and zero volts. The current sampling circuit 344 extracts a portion of the current flowing through the MAMR sensor 134. The fraction bias circuit 346 diverts part of the bias current from the NPN driver 334 to the CMFB loop 340. The dominant frequency pole 348 establishes a low-frequency cutoff point in the feedback path. The feedback pathways 350 transmit correction signals to adjust output voltage levels based on detected common mode conditions.

At 408, the differential voltage regulation loop 360 maintains voltage differential across the MAMR sensor 134 precisely at the provided reference value. The differential voltage regulation loop 360 monitors voltage between the MAMR_P node 312 and MAMR_N node 314. Op-amp A 364A compares MAMR_P node 312 voltage with reference voltage ref_p 368. Op-amp B 364B compares MAMR_N node 314 voltage with reference voltage ref_n 370. These comparisons generate error signals. The summing junction 374 combines these into a single composite error signal. The control block 378 translates this signal into a gate drive signal for the output driver 380. The output driver 380 adjusts current flow based on the error signal. A frequency-limiting element at output node 384 filters high-frequency components of feedback signals.

At 410, the driver circuit 330 switches the voltage differential of the MAMR sensor 134 with extremely rapid rise and fall times (e.g., transition window) of less than fifty ns, twenty ns or less, and/or ten ns or less. This helps provide timing control during write operations. The driver circuit 330 achieves rapid transitions through asymmetric biasing. The PNP driver 332 uses full current while the NPN driver 334 uses partial current. A pre-charge circuit initializes a node in the differential voltage regulation loop 360 to a settled voltage level. Single-ended capacitors at capacitive elements 318 connect to each terminal of the MAMR sensor 134 for frequency compensation. Damping elements 316 attenuate high-frequency oscillations. This arrangement can achieve transition times of approximately twenty ns or less, whereas conventional systems require hundreds of ns.

At 412, the driver circuit 330 synchronizes the switching of the MAMR sensor 134 with a received write/read (WR) enable signals (e.g., WR EN signal 324) from the drive control module 126. The WR EN signal 324 acts as a control input that synchronizes the MAMR sensor 134 with servo operations. It triggers the driver circuit 330 to adjust current through the MAMR sensor 134 within the transition window. This helps provide the MAMR sensor 134 deactivates before the read/write head 132 moves from writing data to reading servo positioning information. The MAMR_IDAC 326 works with the WR EN signal 324 to provide appropriate current levels during active phases.

System-on-Chip

Figure 5:
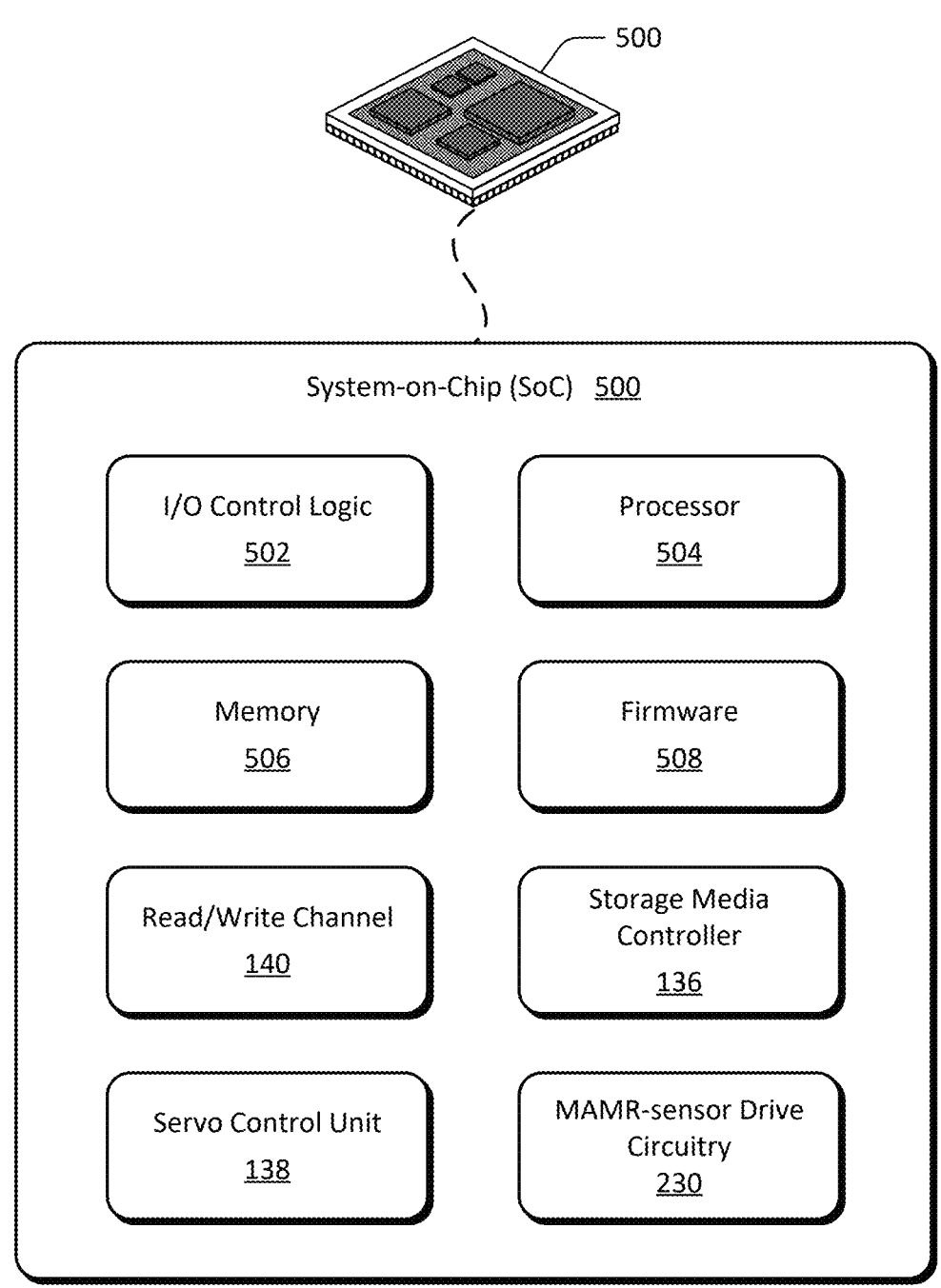
FIG. 5 illustrates an example System-on-Chip (SoC) that may implement various aspects of a differential vMode driver for MAMR.

FIG. 5 illustrates an example System-on-Chip (SoC) 500 that may implement various aspects of the differential vMode driver for MAMR of storage media. The SoC 500 may be implemented in any suitable device, such as a smart-phone, netbook, tablet computer, access point, network-attached storage, camera, smart appliance, printer, set-top box, server, solid-state drive (SSD), magnetic tape drive, hard-disk drive (HDD), storage drive array, memory module, storage media controller, storage media interface, head-disk assembly, magnetic media pre-amplifier, automotive computing system, or any other suitable type of device (e.g., others described herein). Although described with reference to a SoC, the entities of FIG. 5 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 500 may be integrated with electronic circuitry, a microprocessor, memory, input-output (I/O) control logic, communication interfaces, firmware, and/or software useful to provide functionalities of a computing device or magnetic storage system, such as any of the devices or components described herein (e.g., hard-disk drive). The SoC 500 may also include an integrated data bus or interconnect fabric (not shown) that couples the various components of the SoC for data communication or routing between the components. The integrated data bus, interconnect fabric, or other components of the SoC 500 may be exposed or accessed through an external port, parallel data interface, serial data interface, peripheral component interface, or any other suitable data interface. For example, the components of the SoC 500 may access or control external storage media or magnetic write circuitry through an external interface or off-chip data interface.

In this example, the SoC 500 is shown with various components that include input-output (I/O) control logic 502 and a hardware-based processor 504 (processor 504), such as a microprocessor, processor core, application processor, DSP, or the like. The SoC 500 also includes memory 506, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 504 and code stored on the memory 506 are implemented as a storage media controller or as part of a storage media interface to provide various functionalities associated with the differential vMode driver for MAMR of storage media. These functionalities include read/write channel functions, resistance measurement, MAMR calibration, reference voltage adjustment, or the like. In the context of this disclosure, the memory 506 stores data, code, instructions, or other information via non-transitory signals. It does not include carrier waves or transitory signals. Alternatively or additionally, SoC 500 may comprise a data interface for accessing additional or expandable off-chip storage media. This includes magnetic memory or solid-state memory (e.g., Flash or NAND memory).

The SoC 500 may also include firmware 508, applications, programs, software, and/or operating system, which may be embodied as processor-executable instructions maintained on the memory 506 for execution by the processor 504 to implement functionalities of the SoC 500. The SoC 500 may also include other communication interfaces, such as a transceiver interface for controlling or communicating with components of a local on-chip (not shown) or off-chip communication transceiver. Alternatively or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 500. For example, the SoC 500 may include a transceiver interface configured to contribute to storage over a wired or wireless network, such as to provide a network attached storage (NAS) device with the differential vMode driver features.

In this example, the SoC 500 also includes the read/write channel 144, the storage media controller 140, servo control unit 142, and the MAMR sensor drive circuitry 136, which may be implemented separately as shown or combined with a storage component or data interface. Alternatively or additionally, the SoC 500 may include interfaces to a pre-amplifier, and/or a spindle/motor assembly of a magnetic media disk drive. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2 and/or FIG. 3.

The MAMR sensor drive circuitry 136, may be implemented independently or in combination with any suitable component or circuitry to implement aspects described herein. For example, an MAMR sensor drive circuitry may be implemented as part of a DSP, processor/storage bridge, I/O bridge, graphics processing unit, memory controller, storage controller, arithmetic logic unit (ALU), or the like. The MAMR sensor drive circuitry 136 may also be provided integral with other entities of SoC 500, such as integrated with the processor 504, memory 506, a storage media interface, or firmware 508 of the SoC 500. Alternatively or additionally, the MAMR sensor drive circuitry 136, and/or other components of the SoC 500 may be implemented as hardware, firmware, fixed logic circuitry, or any combination thereof.

Figure 6:
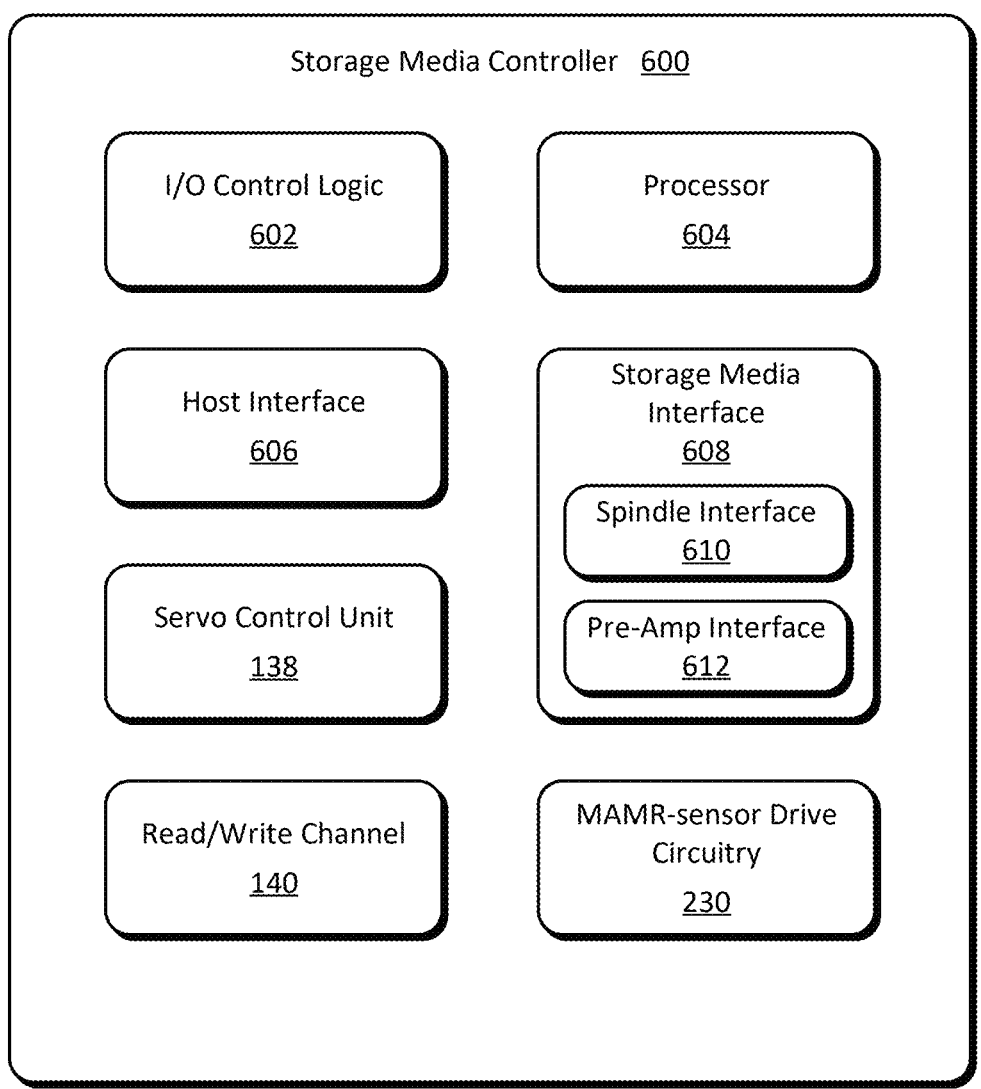
FIG. 6 illustrates an example storage media controller in accordance with one or more aspects of a differential vMode driver for MAMR.

As another example, consider FIG. 6 which illustrates an example storage media controller 600 in accordance with one or more aspects of the differential vMode driver for MAMR applications of HDDs. Generally, the storage media controller 600 enables the computing device 102 to access contents of magnetic storage media, such as an operating system, applications, or data for applications or other services. The storage media controller may also write and read data of the computing device 102 to and from the magnetic storage media with which the controller is associated. In various aspects, the storage media controller 600 or any combination of components thereof may be implemented as a storage drive controller (e.g., HDD controller or HDD chipset), storage media controller, NAS controller, storage media interface, storage media endpoint, storage media target, or a storage aggregation controller for magnetic storage media, solid-state storage media, or the like (e.g., hybrid SSD/HDD storage systems).

In some cases, the storage media controller 600 is implemented similar to or with components of the SoC 500 as described with reference to FIG. 5. In other words, an instance of the SoC 500 may be configured as a storage media controller, such as the storage media controller 600 to manage magnetic storage media. In this example, the storage media controller 600 includes input-output (I/O) control logic 602 and a processor 604, such as a microprocessor, microcontroller, processor core, application processor, DSP, or the like. The storage media controller also includes a host interface 606 (e.g., SATA, PCIe, NVMe, or Fabric interface) and a storage media interface 608 (e.g., magnetic media interface or head-disk assembly (HDA) interface), which enable access to a host system (or fabric) and storage media, respectively. In this example, the storage media interface includes separate instances of a spindle interface 610 and a pre-amp interface 612, such as to contribute to communication with a head-disk assembly of a media drive.

In some aspects, the storage media controller 600 implements aspects of the differential vMode driver for MAMR applications of HDDs when managing or enabling access to storage media that is coupled to the storage media interface 608. The storage media controller 600 may provide a storage interface for a host system via the host interface 606. Storage access commands are received from the host system through this interface. These commands include data to write to the magnetic storage media or commands to read data from the magnetic storage media. During operations associated with these commands, the vMode driver implementation achieves approximately 50, 30, 20, 10, and/or 5-nanosecond transition times for enhanced servo operations. As shown in FIG. 6, the storage media controller 600 includes a servo control unit 142, read/write channel 144, and the MAMR sensor drive circuitry 136 for implementing aspects of the differential vMode driver.

The servo control unit 142 is operably coupled to the spindle interface 610 and may provide spindle or voice coil control for a magnetic media drive. In some aspects, the processor 604 and firmware or logic of the storage media controller 600 are implemented to provide multiple functionalities. These include the MAMR sensor resistance measurement calibration, MAMR sensor current level adjustments, and various data writing or processing functionalities. All these functionalities may be implemented in association with the differential vMode driver for MAMR of storage media.

The MAMR sensor drive circuitry 136 of the storage media controller 600 may be implemented separately as shown or combined with the processor 604, read/write channel 144, or storage media interface 608. Examples of these components and/or entities, or corresponding functionality, are described with reference to the respective components or entities of the environment 100 of FIG. 1 or respective configurations illustrated in FIGS. 2 and/or FIG. 3. The MAMR sensor drive circuitry 136, either in whole or part, may be implemented as processor-executable instructions maintained by memory of the controller and executed by the processor 604 to implement various aspects and/or features of the differential vMode driver for MAMR applications of HDDs.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. An apparatus that facilitates a fast transition during microwave-assisted magnetic recording (MAMR) magnetic recording, the apparatus comprising:
   a driver circuit configured to provide controlled bias current, the driver circuit having separate source and sink output terminals and being responsive to feedback signals;
   a MAMR sensor coupled between the source and sink output terminals through which the MAMR sensor receives the controlled bias current provided by the driver circuit;
   a common-mode feedback (CMFB) loop coupled to the source and sink output terminals of the driver circuit, the CMFB loop configured to detect common-mode voltage (CMV) and provide feedback signals to the driver circuit to maintain CMV regulation of the MAMR sensor; and
   a differential voltage regulation loop coupled to the source and sink output terminals of the driver circuit, the differential voltage regulation loop configured to provide feedback signals to maintain a voltage differential of the MAMR sensor at a reference value.

2. The apparatus of claim 1, wherein the source terminal of the driver circuit includes a positive-negative-positive (PNP) driver based at full controlled bias current and the sink terminal includes a negative-positive-negative (NPN) driver biased at a portion of the controlled bias current.

3. The apparatus of claim 1, wherein the MAMR sensor has one or more single-ended capacitors for frequency compensation to stabilize feedback signals from the CMFB loop and differential voltage regulation loop.

4. The apparatus of claim 1, wherein the CMFB loop is further configured to detect the CMV by sampling only a portion of a current through the MAMR sensor that is coupled between the source and sink output terminals of the driver circuit.

5. The apparatus of claim 1, wherein the CMFB loop is further configured to maintain the CMV regulation of the MAMR sensor at approximately zero volts.

6. The apparatus of claim 1, wherein the differential voltage regulation loop is further configured to monitor the voltage differential of the MAMR sensor.

7. The apparatus of claim 1, wherein a voltage digital-to-analog converter (VDAC) of the differential voltage regulation loop is configured to determine the reference value.

8. The apparatus of claim 1, wherein the reference value is independent of the CMV regulation performed by the CMFB loop.

9. The apparatus of claim 1 further comprising a pre-charge circuit coupled to a node in the differential voltage regulation loop, the pre-charge circuit being configured to initialize the node to a settled voltage level.

10. The apparatus of claim 1 further comprising a frequency-limiting element set at a node in the differential voltage regulation loop, the frequency-limiting element being configured to filter high-frequency components of feedback signals from the CMFB loop and differential voltage regulation loop.

11. The apparatus of claim 1, wherein the driver circuit is further configured to rapidly transition the voltage differential across the MAMR sensor based on write/read (WR) enable signals.

12. A hard-disk drive system that facilitates a fast transition during microwave-assisted magnetic recording (MAMR) magnetic recording, the hard-disk drive system comprising:
   a write head including a microwave-assisted magnetic recording (MAMR) sensor;
   a voltage-mode (vMode) driver circuitry configured to drive a differential voltage of the MAMR sensor, the vMode driver circuitry including:
      a driver circuit configured to be responsive to feedback signals and has separate source and sink output terminals between which the MAMR sensor is coupled;
      a common-mode feedback (CMFB) loop coupled to the source and sink output terminals of the driver circuit, the CMFB loop configured to detect common-mode voltage (CMV) and provide feedback signals to the driver circuit to maintain CMV regulation of the MAMR sensor; and
      a differential voltage regulation loop coupled to the source and sink output terminals of the driver circuit, the differential voltage regulation loop configured to provide feedback signals to maintain a voltage differential of the MAMR sensor at a reference value.

13. The hard-disk drive system of claim 12, wherein the source terminal of the driver circuit includes a positive-negative-positive (PNP) driver based at full bias current and the sink terminal includes a negative-positive-negative (NPN) driver biased at a portion of the bias current.

14. The hard-disk drive system of claim 12, wherein:
   the vMode driver circuitry further includes a frequency-limiting element set at a node in the differential voltage regulation loop; and
   the MAMR sensor has one or more single-ended capacitors;

the frequency-limiting element and the one or more single-ended capacitors are configured to facilitate frequency compensation to stabilize feedback signals from the CMFB loop and differential voltage regulation loop.

15. The hard-disk drive system of claim 12, wherein the CMFB loop is further configured to detect the CMV by sampling only a portion of a current through the MAMR sensor that is coupled between the source and sink output terminals of the driver circuit.

16. The hard-disk drive system of claim 12, wherein the CMFB loop is further configured to maintain the CMV regulation of the MAMR sensor at approximately zero volts.

17. The hard-disk drive system of claim 12, wherein the vMode driver circuitry is further configured to rapidly transition the voltage differential across the MAMR sensor with rise and fall times of ten nanoseconds or less.

18. A method that facilitates a fast transition during microwave-assisted magnetic recording (MAMR) magnetic recording, the method comprising:

providing a reference value for a voltage differential;

providing, by a driver circuit, a bias current to a MAMR sensor of a magnetic media read/write channel;

maintaining, by a common-mode feedback (CMFB) loop coupled to the driver circuit, a common-mode voltage (CMV) regulation of the MAMR sensor;

maintaining the voltage differential across the MAMR sensor at the reference value; and switching the voltage differential across the MAMR sensor with rise and fall times of twenty nanoseconds or less.

19. A method of claim 18, wherein the switching of the voltage differential across the MAMR sensor with a rise time or fall time of ten nanoseconds or less.

20. A method of claim 18, further comprising:

receiving write/read (WR) enable signals; and synchronizing the switching of the voltage differential with the WR enable signals.

\* \* \* \* \*